United States Patent [19]

Murphy, Jr. et al.

[11] Patent Number: 4,773,733

[45] Date of Patent: Sep. 27, 1988

[54] VENETIAN BLIND HAVING PRISMATIC REFLECTIVE SLATS

[75] Inventors: John A. Murphy, Jr., 7273 N. Central Ave., Phoenix, Ariz. 85020; Dan K. Campbell, Scottsdale, Ariz.

[73] Assignee: John A. Murphy, Jr., Phoenix, Ariz.

[21] Appl. No.: 117,076

[22] Filed: Nov. 5, 1987

[51] Int. Cl.[4] ........................ G02B 17/00; G02B 27/00

[52] U.S. Cl. ........................................ 350/260; 52/308; 160/236; 350/262; 350/263; 350/265

[58] Field of Search ................................ 350/258-265; 52/308, 200; 160/236

[56] References Cited

U.S. PATENT DOCUMENTS

| | | | |
|---|---|---|---|
| 593,045 | 11/1897 | Cummings | 350/261 |
| 650,209 | 5/1900 | White | 350/260 |
| 717,782 | 1/1903 | Wadsworth | 350/261 |
| 719,066 | 1/1903 | Wadsworth | 350/260 |
| 720,987 | 2/1903 | Wadsworth | 350/262 |
| 721,256 | 2/1903 | Wadsworth | 350/262 |
| 749,761 | 1/1904 | Wadsworth | 350/262 |
| 1,639,474 | 11/1926 | Whitmore | 350/263 X |
| 2,812,690 | 11/1957 | Boyd | 350/260 |
| 2,812,691 | 11/1957 | Boyd | 350/260 |
| 2,812,692 | 11/1957 | Boyd | 350/260 |
| 2,858,734 | 11/1958 | Boyd | 350/260 |
| 2,993,409 | 7/1961 | Boyd | 350/262 |
| 3,185,034 | 5/1965 | Youngblood | 350/262 |
| 3,255,665 | 6/1966 | Wieher et al. | 350/262 |
| 3,393,034 | 7/1968 | Imai | 350/260 |
| 3,438,699 | 4/1969 | Seeger | 350/263 |
| 3,709,583 | 1/1973 | Pfannkuch et al. | 350/260 |
| 4,069,812 | 1/1978 | O'Neill | 126/271 |
| 4,315,671 | 2/1982 | Bunch | 350/451 |
| 4,337,754 | 7/1982 | Conger | 126/430 |
| 4,505,255 | 3/1985 | Baer | 126/419 |
| 4,509,825 | 4/1985 | Otto et al. | 350/259 |
| 4,517,960 | 5/1985 | Bartenbach | 126/440 |

*Primary Examiner*—Richard A. Wintercorn
*Attorney, Agent, or Firm*—Cahill, Sutton & Thomas

[57] ABSTRACT

A venetian blind having prismatic reflective slatted panels permits the passage of indirect rays of sunlight into a space to be illuminated while reflecting direct rays of sunlight away from the space to be illuminated. The prismatic reflective slats are supported for rotation in unison to follow elevational movements of the sun. Each of the prismatic panels is made from a light transmissive material having a front face directed at the sun and an opposing rear face upon which reflective prisms are formed for internally reflecting rays of sunlight that strike the front face of each slatted panel at approximately a 30° angle from a line normal to the front face thereof. The orientation of the reflecting prisms in this manner maximizes overall visibility between adjacent slatted panels. A diffusion panel is secured to the rear face of each prismatic reflective slat for diffusing indirect rays of sunlight transmitted through the prismatic reflective slats. The prisms formed upon the rear face of each reflective slat may be linear prisms or triangular pyramidal prisms.

54 Claims, 4 Drawing Sheets

FIG. 1
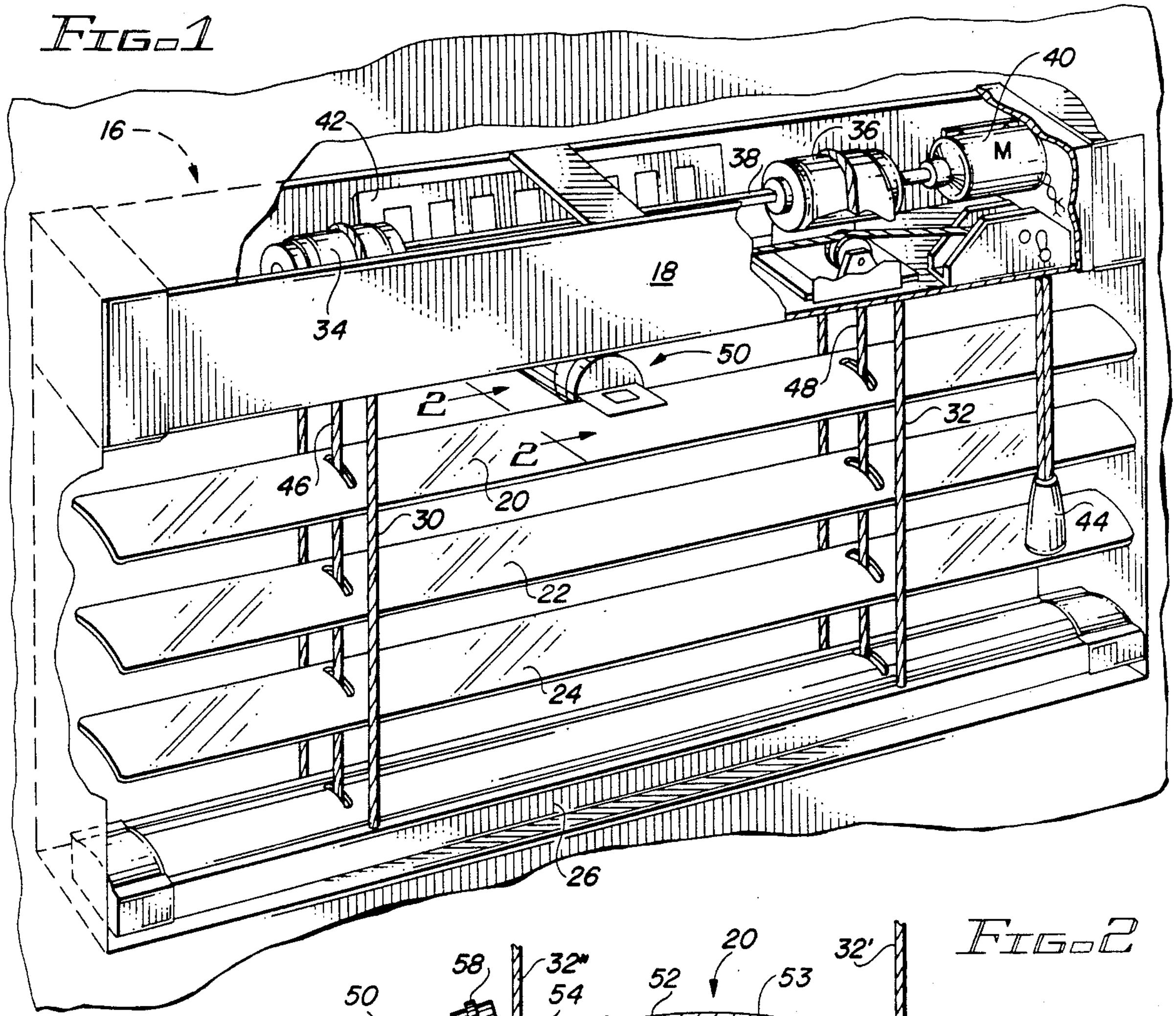
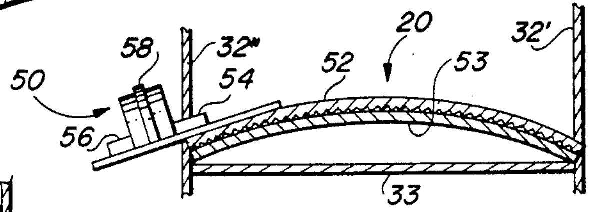
FIG. 2
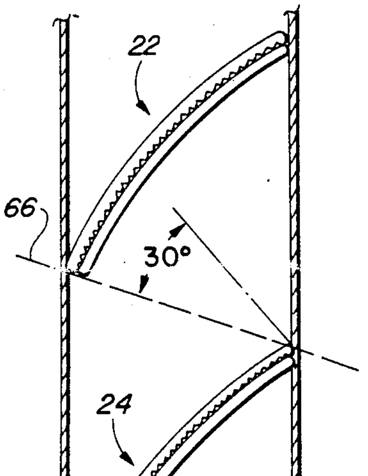
FIG. 3A
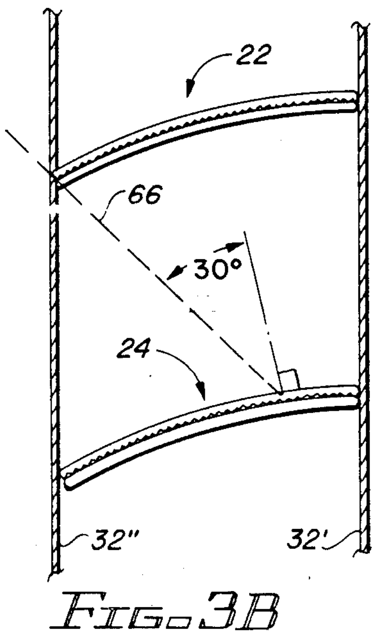
FIG. 3B
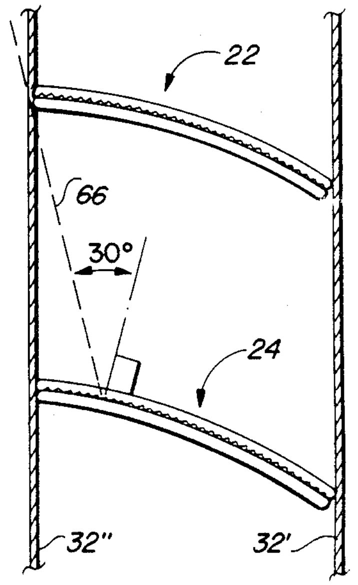
FIG. 3C

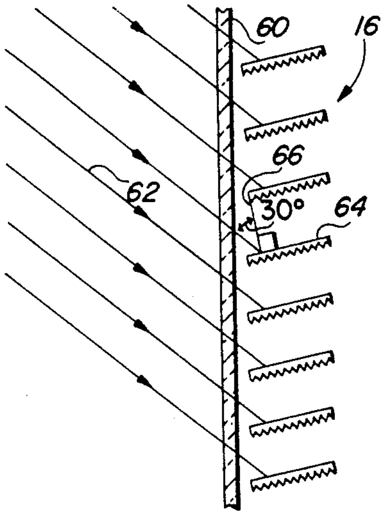
FIG. 4
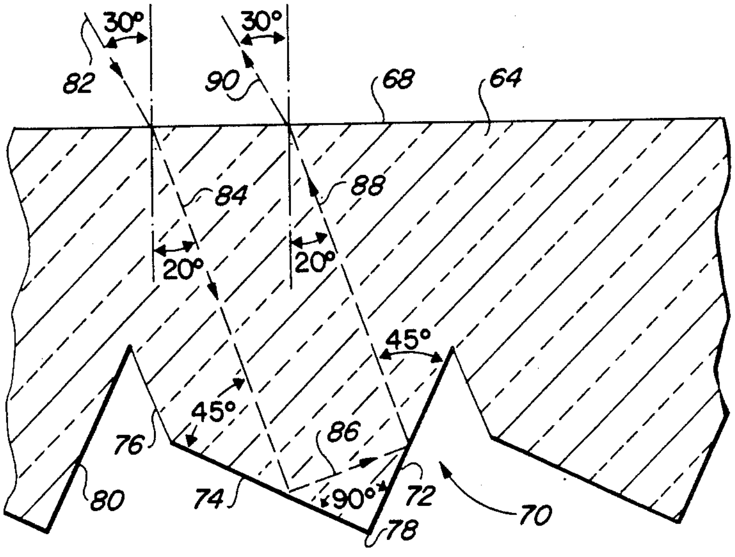
FIG. 5
FIG. 7A
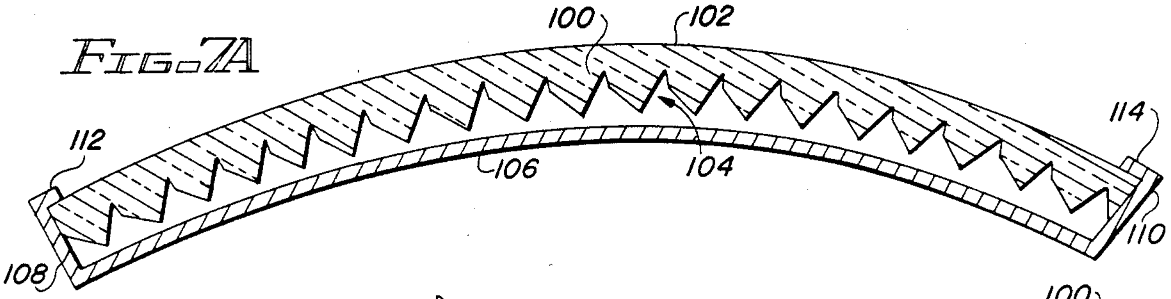
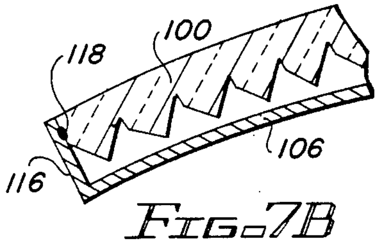
FIG. 7B
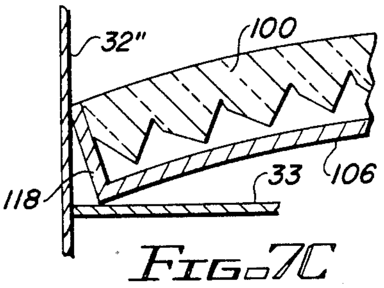
FIG. 7C
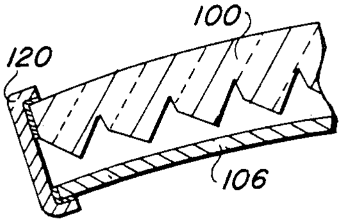
FIG. 7D
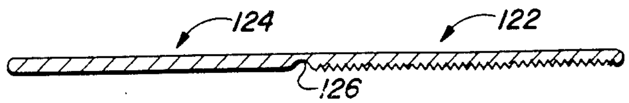
FIG. 8A
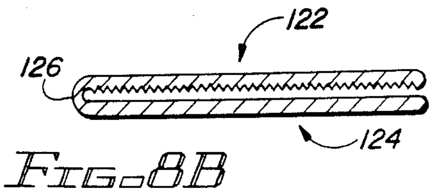
FIG. 8B
FIG. 9
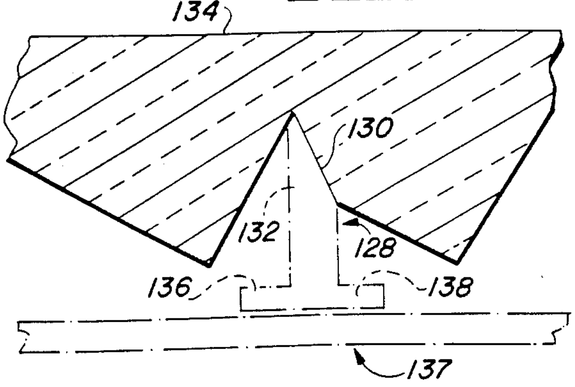

VENETIAN BLIND HAVING PRISMATIC REFLECTIVE SLATS

BACKGROUND OF THE INVENTION

1. Field of the Invention

The present invention relates generally to shading mechanisms used to control the passage of sunlight into a space to be illuminated, and more particularly, to a venetian blind structure incorporating light-transmissive prismatic slatted panels for reflecting glaring direct rays of sunlight while transmitting indirect rays of sunlight.

2. Description of the Prior Art

Many types of curtains, blinds and screens are known for controlling the amount of natural daylight admitted into a room or building through a window, skylight, or other light opening. In most cases, such curtains, blinds or screens are totally or partially opaque to shade the area to be illuminated from direct glaring rays of sunlight. However, the opaque portions of such light control devices also block indirect rays of sunlight which strike such opaque portions from reaching the area to be illuminated. In addition, such opaque light control devices absorb heat from blocked rays of direct sunlight, and may thereby add undesired heat to the area being illuminated.

Light control mechanisms have also been disclosed wherein transparent lenses, slats, or blinds are used to selectively admit or reflect rays of sunlight. For example, U.S. Pat. No. 3,438,699 discloses a multiple slat assembly similar to a venetian blind wherein each slat is composed of two transparent pieces of material having interfitting prisms to exclude light and heat rays coming from a particular direction. U.S. Pat. Nos. 2,812,690; 2,812,691; 2,858,734; and 2,993,409 all disclose skylights having prismatic lenses for selectively admitting or reflecting rays of sunlight. U.S. Pat. No. 2,812,692 discloses a glass block structure using prismatic surfaces to selectively admit or reflect rays of sunlight depending upon their angle of entry. U.S. Pat. No. 3,393,034 discloses a light control blind using a series of elongated rectangular panels, each panel being formed of intermeshing pairs of prismatic plates for blocking downwardly directed light rays while permitting the passage of upwardly directed light rays. U.S. Pat. No. 4,517,960 also discloses a slatted structure wherein light-permeable slats have a prismatic surface for reflecting direct overhead rays of sun.

Apart from blocking direct rays of sunlight from passing into the illuminated space, it is also an objective of many light control blinds to permit a person within the illuminated area to be able to look through the blind in order to view the outdoors. Some prior art devices achieve this objective by intermeshing a second prismatic panel with the first prismatic panel, so that light rays refracted away from their original angular path by the first prismatic panel are refracted back to their original angular path by the second prismatic panel. However, such structures often exhibit alternating clear and dark bands which are distracting and which interfere with a clear view through the blind structure. Moreover, the blind structures shown in U.S. Pat. Nos. 3,438,699 and 4,517,960 use linear prisms which are formed symmetrically about the light entry face of each slat; accordingly, the slats of each such blind structure would need to be set at approximately a 45° angle in order to ideally reflect direct rays of sunlight approaching from a 45° angle of elevation from the horizon. However, positioning the slats at a 45° angle would virtually eliminate any level line of sight between adjacent slats. Furthermore, while such prior art blind structures may permit limited viewing of the outdoors through the slat elements themselves, any attempt to incorporate a diffusion element to more evenly diffuse the light transmitted by such slats would interfere with the ability to view the outdoors through the slats of the blind.

Accordingly, it is an object of the present invention to provide a shade mechanism which permits the passage of indirect rays of sunlight into a space to be illuminated while substantially reflecting direct rays of sunlight away from the space to be illuminated.

It is another object of the present invention to provide such a shade mechanism which minimizes any interference with vision through the shade mechanism for a person located within the illuminated space attempting to view the outdoors.

It is still another object of the present invention to provide such a shade mechanism using a plurality of transparent, prismatic slatted panels adapted to reflect direct rays of sunlight, which slatted panels are normally oriented in a position which permits level vision between adjacent slatted panels.

It is yet another object of the present invention to provide such a shade mechanism wherein light transmitted through such slatted panels may be diffused to more evenly illuminate the illuminated space without interfering with vision through the shade mechanism.

It is a further object of the present invention to provide such a shade mechanism which minimizes heat gain from direct rays of sunlight.

It is a still further object of the present invention to provide such a shade mechanism which may be used on vertical light openings, such as conventional windows, as well as in conjunction with horizontal or slanted light openings.

These and other objects of the present invention will become more apparent to those skilled in the art as the description thereof proceeds.

SUMMARY OF THE INVENTION

Briefly described, and in accordance with a preferred embodiment thereof, the present invention relates to a shade mechanism for permitting the passage of indirect rays of sunlight into a space to be illuminated while reflecting direct rays of sunlight away from the space to be illuminated, the shade mechanism including multiple slatted panels, each supported for rotation about its longitudinal axis. The slatted panels are supported in venetian blind fashion, and a tilt mechanism is provided for causing each of the slatted panels to rotate in unison, while maintaining the multiple slatted panels parallel to one another. Each of the multiple slatted panels is made of a substantially clear, light transmissive material. Each such panel has a front face for being directed at the sun and an opposing rear face having prisms formed thereon. The prisms formed upon the rear face of each such panel cause rays of sunlight striking the front face of each such panel within a predetermined band of angles to be internally reflected and emitted back out through the front face of each such panel. The prisms formed upon the rear face of each such panel permit indirect rays of sunlight lying outside the aforementioned angular range to be transmitted through such panel into the space to be illuminated.

In order to minimize interference with vision between adjacent panels, the prisms formed upon the rear face of each such panel are adapted to focus upon and internally reflect direct rays of sunlight which strike the front face of each such panel in a predetermined band of angles extending substantially symmetrically about a central focal angle. The central focal angle lies within the range of about 20°-40° to the normal, relative to the front face of each such slated panel. Preferably, the central focal angle lies within the range of 25°-35° to the normal, and in the preferred embodiment, the central focal angle lies at substantially 30° to the normal relative to the front face of each such slatted panel, in order to maximize visibility between the slatted panels under normal operating conditions. Preferably, the tilt mechanism is adapted to position the multiple slatted prismatic panels in a manner such that a plane lying parallel to the longitudinal axis of a slatted panel and containing a direct ray of sunlight will intercept the front face of each such panel at an angle of approximately 30° to the normal in order to maximize reflection of direct rays of sunlight. Accordingly, the tilt mechanism ideally includes a solar tracker sensitive to the position of the sun for controlling rotation of the slatted panels in response to daily and seasonal movements of the sun. If desired, an offset may be incorporated into the solar tracker during winter months to transmit direct rays of sunlight when additional heating is required.

In its preferred form, the present invention further includes a diffusion panel associated with each slatted panel and positioned adjacent the rear face of each slatted panel for diffusing light transmitted through each such slatted panel. Such diffusion panels function to disperse any errant rays of direct sunlight that are not reflected by the prismatic slatted panels; in addition, diffusion panels serve to diffuse the transmitted indirect rays of sunlight to more evenly illuminate the room. During winter months, such diffusion panels disperse direct rays transmitted through the slatted panels. Such diffusion panels may be made of a translucent material or a transparent material having an irregular surface. An insulating air space may be created between the rear face of each slatted panel and its associated diffusion panel for increasing the insulative properties of the shade mechanism when the slats are fully closed. The diffusion panels may be tinted to impart colorization to the transmitted light.

The prisms formed upon the rear face of each slatted panel may be of any type which is adapted to internally reflect direct rays of sunlight approaching from within the range of angles of light to be rejected. Preferred forms of prismatic surfaces include pyramidal prisms (such as multifaceted pyramidal prisms, conical prisms, and semi-spherical prisms) and linear elongated prisms.

Slatted panels using linear elongated prisms may be formed by providing a series of 3-faced linear prisms upon the rear face of each slatted panel. Each 3-faced linear prism preferably has first and second faces of approximately equal width disposed at a right angle to one another, and including a third face extending between successive pairs of such first and second faces. The first and second faces of each 3-faced linear prism are oriented so that a plane bisecting the angle formed between the first and second faces extends parallel with refracted direct rays of sunlight as they pass from the front face to the rear face within each slatted panel.

As set forth above, the first and second faces of each 3-faced linear prism focus upon and reflect direct rays of sunlight striking the front face of each such slatted panel in a predetermined band of angles that extends symmetrically about a central focal angle. The central focal angle for incident direct rays of sunlight lies within the range of 20°-40° to the normal relative to the front face of the panel, and preferably within the range of 25°-35°, with the central focal angle of 30° to the normal, relative to the front face of the panel, being the preferred orientation. For light-transmissive materials exhibiting an index of refraction of approximately 1.5, rays of direct sunlight striking the front face of the slatted panels at an incident angle of 30° to the normal will be refracted at an angle of approximately 20° to the normal; accordingly, the first and second faces of each 3-faced linear prism are preferably oriented so that a plane bisecting the angle formed therebetween lies at 20° to the normal. The third face of each 3-faced linear prism is also preferably set at 20° to the normal to avoid interference with the reflection of direct rays of sunlight by the first and second faces.

Each slatted panel may, if desired be formed as a curved or segmented structure rather than as a planar structure. In such event, each 3-faced linear prism is oriented to internally reflect direct rays that strike that portion of the front face of the slatted panel lying proximate each such 3-faced linear prism.

In one embodiment of the present invention, the front face of each slatted panel has a stepped surface consisting of alternating first and second surfaces arranged substantially perpendicular to one another. Each of the first surfaces is disposed at an angle of approximately 30° from the front face of the slatted panel as a whole in order to present a surface that is substantially perpendicular to the direct rays of sunlight that are to be reflected, while the second such surface is oriented parallel thereto. In this case, the path of the direct rays of sunlight to be reflected by the slatted panel is not initially altered as the rays of light pass into the slatted panel, and accordingly, the first and second faces of the 3-faced linear prisms are oriented such that a plane bisecting the angle formed therebetween is perpendicular to the aforementioned first surface. The number of steps formed upon the front face of each slatted panel may be equal to the number of 3-faced prisms formed upon the rear face of each such slatted panel.

In an alternate embodiment of the present invention, the rear face of each slatted panel includes a series of prismatic surfaces each extending parallel to the longitudinal axis of the slatted panel and extending generally parallel to one another. A corresponding group of second surfaces are interposed between successive prismatic surfaces. Each prismatic surface is inclined at an angle with respect to the front face of the slatted panel as a whole, and each prismatic surface includes two or more prisms for reflecting direct rays of sunlight back out through the front face of the slatted panel. Preferably, each prismatic surface includes a number of consecutive, symmetrical 2-faced linear prisms having first and second faces angled at 90° to one another. In those instances when the front face of the slatted panel is relatively smooth, a plane bisecting the first and second faces of one of the 2-faced linear prisms intersects the front face of the slatted panel at an angle of substantially 20° to the normal so that rays of direct sunlight striking the front face at an incident angle of about 30° to the normal will be internally reflected by the 2-faced linear prisms.

Alternatively, the front face of the slatted panel may have a stepped surface consisting of alternating first and second surfaces, the first surfaces of the front face being oriented at an angle of approximately 30° to the front face of the slatted panel as a whole. In this instance, the prismatic surfaces of the rear face extend virtually parallel with the first surfaces of the front face, and the plane bisecting the angle formed between the first and second faces of each 2-faced linear prism extends perpendicular to an overlying first surface of the front face of the slatted panel.

BRIEF DESCRIPTION OF THE DRAWINGS

FIG. 1 is a perspective view of a shade mechanism in the form of a venetian blind having prismatic reflective slats in accordance with the teachings of the present invention.

FIG. 2 is a cross-sectional view of a prismatic reflective slat taken through lines 2—2 as shown in FIG. 1, and showing a sun position sensor for use in controlling the tilt angle of the slatted panels.

FIGS. 3A, 3B and 3C are edge views of a pair of slatted panels within the shade mechanism for various angles of incidence of direct rays of sunlight.

FIG. 4 is a cross-sectional view of the shade mechanism shown in FIG. 1 lying adjacent a window and illustrating the manner in which direct rays of sunlight may be reflected while permitting a view of the outdoors from between adjacent slats.

FIG. 5 is a detailed partial sectional view of a slatted panel incorporating a 3-faced linear prism upon the rear face of the slatted panel.

FIGS. 7A, 7B, 7C and 7D are cross-sectional views of a slatted prismatic panel having an associated diffusion panel positioned adjacent the rear face of the slatted panel.

FIGS. 8A and 8B are side views of a unitary prismatic panel and associated diffusion panel hingedly connected to one another.

FIG. 9 is a partial cross-sectional view of a slatted reflective panel including 3-faced linear prisms and illustrating an optional extension member associated with the third face of a 3-faced linear prism.

DETAILED DESCRIPTION OF THE PREFERRED EMBODIMENTS

Figures 6, 10, 11A, 11B, 11C, 11D, 12A, 12B, 12C:
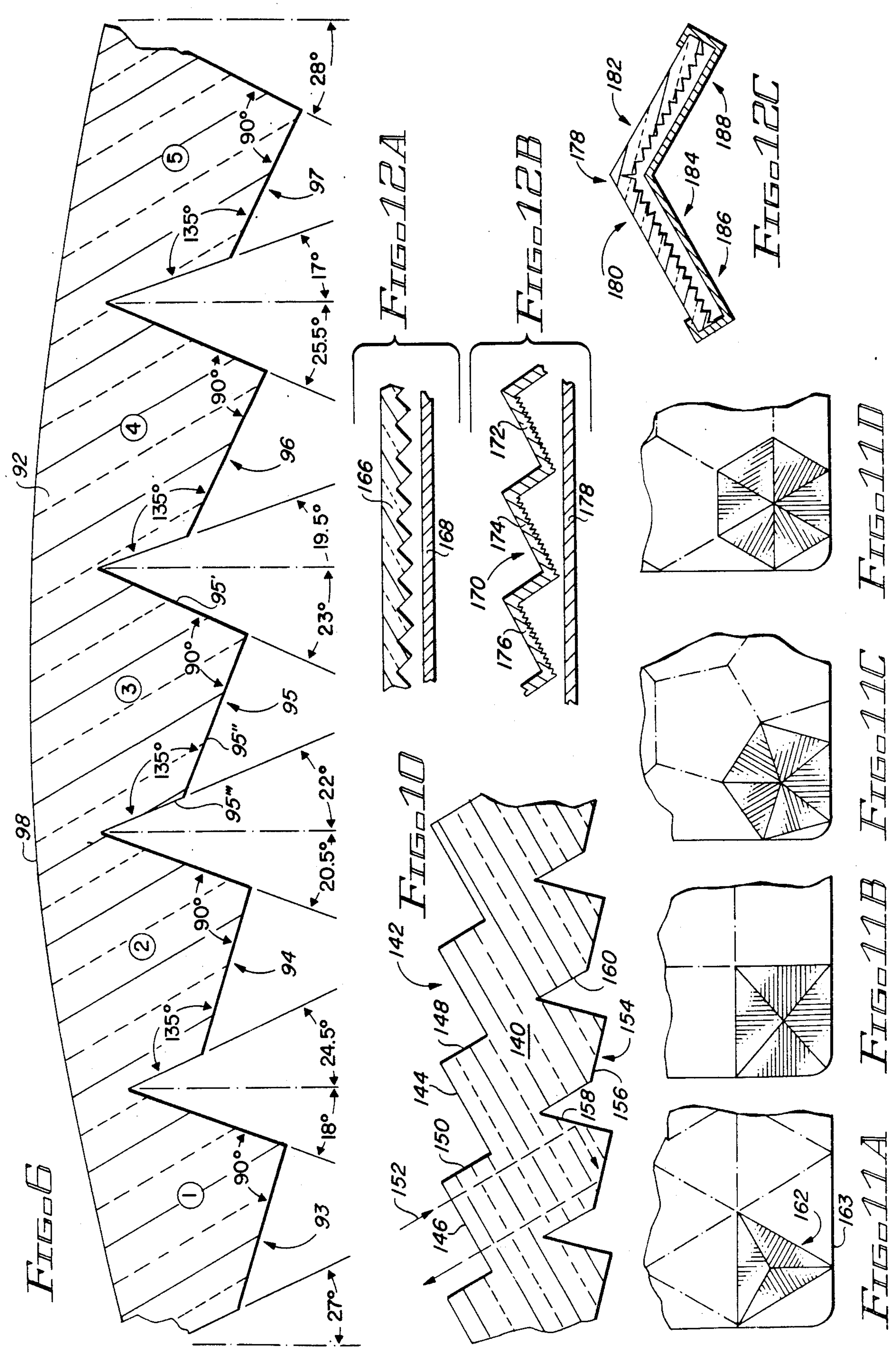
FIG. 6 is a partial cross-sectional view of a slatted reflective panel having a curved front face and a series of 3-faced linear prisms formed upon the rear face thereof.
FIG. 10 is a modified form of slatted panel wherein the front face thereof is provided with a stepped surface wherein direct rays of sunlight to be reflected by the slatted panel initially strike a surface oriented perpendicular to such direct rays of sunlight.
FIGS. 11A, 11B, 11C and 11D are bottom views of various embodiments of slatted panels having triangular pyramidal prisms formed upon the rear faces thereof.
FIG. 12A shows a substantially flat slatted prismatic panel and an associated flat diffusion panel.
FIG. 12B is a cross-sectional view of a segmented slatted prismatic panel and an associated flat diffusion panel.
FIG. 12C is a cross-sectional view of a slatted prismatic panel having a central bend therein and an associated diffusion panel.

In FIG. 1, a shade mechanism incorporating the present invention is designated generally by reference numeral 16. Shade mechanism 16 includes an upper support bracket 18 and a plurality of slatted panels 20, 22 and 24. Also shown in FIG. 1 is a weighted bottom rail, upon which a similar slatted panel may optionally rest. As shown in FIG. 1, shade mechanism 16 may be installed within a window box 28 shown in dashed outline, like a conventional venetian blind. A pair of rope ladders 30 and 32 extend from upper support bracket 18 to bottom rail 26. As in a conventional venetian blind, rope ladders 30 and 32 support slatted panels 20, 22 and 24 whereby such panels are spaced apart from one another at regular intervals and extend parallel to one another. Referring briefly to FIG. 2, it will be noted that rope ladder 32 includes a first vertical segment 32', a second vertical segment 32", and an interconnecting rope rung 33 interconnected between vertical segments 32' and 32" for supporting slatted panel 20. While rope ladders are shown in FIG. 1, other support structures may also be used including a support structure coupled to the opposing ends of each slatted panel.

Rope ladders 30 and 32 are shown in FIG. 1 as having their upper ends suspended over and around tilt pulleys 34 and 36, respectively for allowing slatted panels 20, 22 and 24 to be rotated in unison about each of their longitudinal axes while maintaining the slatted panels substantially parallel to one another. Tilt pulleys 34 and 36 are engaged with a tilt rod 38 connected to a reversible drive motor 40. Drive motor 40 is operated under the control of electronic circuitry mounted upon printed circuit board 42 located within upper support bracket 18.

Also shown in FIG. 1 is a pull handle 44 for operating a pair of ropes 46 and 48, each of which extends through slotted apertures formed within each slatted panel 20–24, and each of which is attached at its lower end to bottom rail 26. Pull handle 44 may be operated by a user to raise and lower the slatted blind assembly in conventional fashion.

Referring to both FIGS. 1 and 2, a sun position sensor, designated generally by reference numeral 50, is shown as being secured to the outermost edge of slatted panel 20, i.e., the edge of slatted panel 20 which is closest to the window or other light opening through which sunlight is directed toward shade mechanism 16. Sun position sensor 50 may be of the shaded dual photocell type wherein a pair of photocell assemblies 54 and 56 are disposed on opposite sides of a shade 58. Electronic circuitry mounted on printed circuit board 42 is designed to sense any imbalance in the amounts of light detected by photocell assemblies 54 and 56, and upon detecting such an imbalance, operates drive motor 40 in the appropriate direction until a balanced condition is again achieved. As will be explained in greater detail below, sun position sensor 50 is set at an angle relative to slatted panel 20 such that, in the balanced condition, direct rays of sun strike the upper face of slatted panel 20 at approximately a 30° angle relative to a line normal to the front or upper face of slatted panel 20. While it is usually desired to reflect away direct rays of sunlight to avoid excessive heat gain, it may be desired to transmit direct rays of sunlight during the winter to add heat to the illuminated space. In this event, sun position sensor 50 can be modified to incorporate an offset to purposely misalign the focus of the prisms formed upon the slatted panels and diffused by associated diffusion panels. Sun position sensor 50 can be made to provide such an offset by, for example, modifying the angle at which it extends from slatted panel 20. Alternatively, shade 58 may be replaced with a wintertime shade (not shown) having non-symmetrical sides to create an offset tracking error. This wintertime offset is added to maintain the front faces of the slatted panels in an offset position wherein a direct ray of sunlight strikes one of the slatted panels at an angle, relative to the normal, lying outside of the predetermined band of angles of light reflected by the prisms formed upon the face of each slatted panel. Electronic circuitry which may be used to operate drive motor 40 in response to sun position sensor 50 is disclosed, for example, in U.S. Pat. No. 4,429,952, and the disclosure of such patent is hereby incorporated herein by reference.

It may be recalled that one of the objectives of the present invention is to reflect direct rays of sunlight away from the space to be illuminated without substantially interferring with vision of a person within the illuminated space through the shade mechanism. Referring to FIG. 4, a cross-sectional drawing is shown of shade mechanism 16 positioned adjacent a window 60. While FIG. 1 illustrates only three slatted panels 20–24, it should be clear that the number of slatted panels selected may be modified to suit the vertical height of the associated window. Within FIG. 4, direct rays of sunlight are indicated by the slanted lines bearing arrowheads, one of which has been designated by reference numeral 62. Ray 62 is shown as passing through window 60 and striking the front face of slatted panel 64. Slatted panel 64 is shown as being positioned at an angle such that ray 62 forms approximately a 30° angle with an imaginary line, indicated by reference numeral 66, that is normal to the front face of slatted panel 64. Referring briefly to FIGS. 3A–3C, incident rays of direct sunlight are designated by dashed lines 64 for various elevations of the sun. FIGS. 3A–3C illustrate how the angular orientation of the slatted panels 20–24, or alternatively slatted panel 64 in FIG. 4, are tilted to maintain direct ray of sunlight 64 at a 30° angle to the normal relative to the front face of each slatted panel. The drawing in FIG. 3A illustrates a very low elevation of the sun corresponding with early morning light entering an easterly facing window, or late afternoon sunlight entering a westerly facing window. On the other hand, the drawing shown in FIG. 3C illustrates a relatively high elevation of the sun, as might correspond to the position of the summer sun near noon time entering a southernly-facing window.

Those skilled in the art will note that the slatted panels shown in FIGS. 3B and 3C are oriented in a near horizontal position and provide minimal interference with vision through the spaces between successive slatted panels so that a person occupying the illuminated space may view the outdoors between the slatted panels. Only when sunlight strikes the shade mechanism at a low elevational angle (for vertical light openings) is vision through shade mechanism 16 somewhat curtailed, as shown in FIG. 3A. Thus, by designing the slatted panels to reject direct rays of sunlight striking from an oblique angle relative to the front face of the slatted panels, outward vision through the spaces between adjacent slatted panels can be maximized.

It should also be recalled that one of the objectives of the present invention is to reflect away from the illuminated space direct rays of sunlight while permitting the passage of indirect rays of sunlight. In this regard, the construction of the prismatic slatted panels will now be described in greater detail. As shown in FIG. 4, the front face of slatted panel 64 is relatively smooth, while the rear face of slatted panel 64 has, in cross section, a series of ridges formed by a series of linear prisms. FIG. 5 is an enlarged cross section of slatted panel 64, wherein the front face thereof is designated by reference numeral 68, and wherein the rear face thereof is designated generally by reference number 70. Slatted panel 64 serves to reflect direct rays of sunlight through internal reflection of light rays within prisms formed upon rear face 70. While a variety of forms of such prisms may be used, FIG. 5 illustrates one of the preferred forms wherein a series of 3-faced linear prisms are formed across the width of rear face 70 of each such slatted panel.

Referring to FIG. 5, one of such 3-faced linear prisms includes a first face 72, a second face 74, and a third face 76. Preferred materials for constructing such prismatic slatted panels include glass, acrylic, polycarbonate or other clear materials having an index of refraction suitable for achieving internal reflection at a prismatic surface. The linear prisms shown in cross section in FIG. 5 extend for the full length of each slatted panel parallel to the longitudinal axis thereof, and accordingly, such slatted panels may be manufactured commercially using extrusion, embossing, cutting, milling processes, injection molding processes, or compression molding processes.

Still referring to FIG. 5, it will be noted that first face 72 and second face 74 are of substantially equal width and are oriented perpendicular to one another so that an internal angle of substantially 90° is formed therebetween. First face 72 and second face 74 have a common longitudinal edge 78. Third face of the 3-faced linear prism is shown as extending between second face 74 and the first face 80 of the next succeeding 3-faced linear prism. Third face 76 is typically of a lesser width than first and second faces 72 and 74.

It will again be recalled that, in order to maximize vision through the spaces between adjacent slatted panels, it is desirable to maximize reflection of direct rays of sunlight striking front face 68 of panel 64 at an angle of approximately 30° to the normal. Within FIG. 5, an incident ray of direct sunlight is designated by arrow 82. As shown in FIG. 5, incident ray 82 approaches from an angle of 30° relative to the normal. As ray 82 passes into light-transmissive panel 64, the light ray is bent due to refraction and, assuming an index of refraction of approximately 1.5, the ray is redirected along the path shown by arrow 84 at an angle of approximately 20° to the normal. In order to maximize internal reflection of refracted ray 84, second face 74 of the 3-faced linear prism is set at an angle of 45° relative to refracted ray 84. Upon striking second face 74, refracted ray 84 is reflected along the path shown by arrow 86, perpendicular to refracted ray 84. Because first face 72 of the 3-faced linear prism is perpendicular to second face 74, reflected ray 86, upon striking first face 72, is again reflected along the path shown by arrow 88, perpendicular to reflected ray 86 and parallel to refracted ray 84.

Upon striking front face 68, reflected ray 88 is again refracted at the air interface along the path designated by arrow 90. Thus, refracted ray 90 is emitted at the same angle and in the same general direction as incident ray 82.

Those skilled in the art will appreciate that a line bisecting the angle formed between first face 72 and second face 74 would extend parallel to refracted ray 84 and reflected ray 88, and hence would be oriented at approximately a 20° angle relative to the normal. Because the linear prisms shown in FIG. 5 extend along the entire longitudinal axis of slatted panel 64, one may imagine a plane which bisects the angle formed between faces 72 and 74, such plane lying at an angle of 20° to the normal relative to front face 68. Third face 76 is preferably made parallel to the imaginary plane bisecting the angle formed by faces 72 and 74. Thus, third face 76 lies at an angle of approximately 20° to the normal relative to front face 68. By orienting third face 76 in this manner, maximum packing density of such 3-faced linear prisms is achieved, while simultaneously preventing third face 76 from interfering with the internal reflection of direct rays of sunlight.

Due to the daily movements of the sun, the sun will not always be directly in front of the window in which the shade mechanism is installed; accordingly, direct rays of sunlight will often strike the slatted panels from one side or the other, at an angle other than 90° to the longitudinal axis of each slatted panel. The tilt control mechanism described above in regard to FIG. 1 is designed to maintain the slatted panels in a rotational position such that a plane lying parallel to the longitudinal axis of one of the slatted panels and containing a direct ray of sunlight intercepts the front face of the slatted panel at an angle of approximately 30° to the normal. While the incident ray of direct sunlight 82 shown in FIG. 5 has an angle of incidence of 30° to the normal, it should be understood that the 3-faced linear prisms shown in FIG. 5 will also internally reflect rays of light deviating somewhat from 30° to the normal. The angle of 30° merely represents the central focal angle for such linear prisms; a predetermined band of angles of light that are also internally reflected extends substantially symmetrically about the aforementioned central focal angle. For example, when direct rays of sunlight are oriented substantially perpendicular to the longitudinal axes of the slatted panels, then the 3-faced linear prisms shown in FIG. 5 internally reflect rays of light which fall within the band of approximately 25°–35° to the normal relative to front face 68 of the slatted panel. When the sun is to the side of the light opening, and the rays of light are oriented other than perpendicular to the longitudinal axes of the slatted panels, then the band of reflected rays widens beyond the aforementioned 25°–35° angular range. Indirect rays of light striking front face 68 outside the aforementioned band of angles, and which enter panel 64 are not reflected back out front face 68 thereof, but are principally transmitted through rear face 70 into the space to be illuminated. Thus the prisms formed upon the rear face 70 of the slatted panels 64 are highly selective with respect to the rays of light which are rejected from the space to be illuminated.

While FIG. 5 shows the central focal angle for internally reflected rays of sunlight to be at 30° to the normal relative to front face 68 of the slatted panel, it should be understood that the central focal angle need not be precisely 30°. The prisms formed upon the rear face of the slatted panels may be formed so that the central focal angle lies within a range of about 20°–40° to the normal, relative to the front face of the slatted panel, while still permitting good overall visibility between adjacent slats of the shade mechanism. Assuming that the central focal angle lies within the range of 20°–40° and an index of refraction of 1.5, then the plane bisecting the angle between faces 72 and 74 would lie at an angle in the range of approximately 13°–26° relative to the normal. The prisms are preferably designed so that the central focal angle lies in the range of 25°–35° to the normal (corresponding with a bisection angle in the range of 16°–23° to the normal), with 30° being the preferred value for vertical light openings in general.

Within FIGS. 4 and 5, slatted panels 64 are shown as being substantially flat and as having a substantially planar front face 68. Referring to FIG. 6, it will be appreciated that prismatic reflective panels may also be formed having a generally curved shape. It is sometimes desirable to impart a cross-sectional, lateral curve to such slatted panels to rigidify the same, particularly when the slatted panels extend over a significant length. Referring to FIG. 6, it will be noted that a series of five 3-faced linear prisms are shown extending laterally across slatted panel 92, the five prisms being designated generally by reference numerals 93, 94, 95, 96 and 97; within FIG. 6, prism 93 is shown at the left most end of the drawing, while prism 97 is shown at the right most end of the drawing. Imparting a curve to front face 98 of panel 92 somewhat complicates the design of linear prisms 93–97. For example, assuming that direct rays of sunlight strike front face 98 at an angle of approximately 30° to the normal near the central portion thereof overlying prism 95, incident rays of light striking front face 98 proximate prism 93 will be at an angle of less than 30° to the normal, while incident rays of light striking front face 98 near prism 97 will approach from an angle greater than 30° relative to the normal. Accordingly, the refracted rays of direct sunlight passing into panel 92 will be oriented in somewhat different directions, and consequently, the angular orientation of each linear prism must be individually determined. Panel 92 shown in FIG. 6 has a front face 98 which extends through an arc of curvature of approximately 29°. The angles shown within FIG. 6 indicate the manner in which the linear prisms are oriented from the left most end of the figure to the right most end of the figure. In each case, each linear prism includes first and second faces forming a 90° internal angle for internally reflecting direct rays of sunlight that strike front face 98 and are refracted within panel 92.

Prism 95 may be regarded as a central linear prism as it is located substantially near the center of the lateral cross section of panel 92. Accordingly, prism 95 is oriented so that its third face 95''' and a plane bisecting its first and second faces 95' and 95'' are directed at an angle of approximately 20° to a line lying normal to the central portion of front face 98. Remaining prisms 93, 94, 96, and 97 are oriented to internally reflect rays of sunlight incident from the same elevational angle as rays of light incident upon the central portion of panel 92. In this manner, all of the prisms simultaneously internally reflect direct rays of sunlight incident upon all portions of front face 98.

It will be recalled that another objective the present invention is to evenly diffuse light transmitted by the slatted panels into the room or other space to be illuminated. Referring to FIG. 7A, a prismatic light-transmissive slatted panel 100 is shown having a front face 102 and a rear face designated generally by reference numeral 104. A diffusion panel 106 is shown in FIG. 7A associated with prismatic panel 100 and positioned adjacent rear face 104 thereof. For relatively flat prismatic panels, the associated diffusion panel extends substantially parallel thereto. In the case of arcuately curved prismatic panels, like that shown in FIG. 7A, diffusion panel 106 extends through a generally similar arcuate curve and extends substantially parallel thereto at any given portion of prismatic panel 100. The purpose of diffusion panel 106 is to evenly diffuse and disperse light emitted from rear face 104 of prismatic panel 102. Accordingly, diffusion panel 106 may be made of a translucent material to achieve such purpose. It should be remembered that the addition of diffusion panel 106 to prismatic panel 100 does not significantly impact the ability to see through a shade mechanism incorporating such prismatic panels when constructed according to the teachings of the present invention, because the shade mechanism is adapted to permit viewing through the spaces between adjacent slatted panels, rather than through the slatted panels themselves.

As an alternative to the formation of diffusion panel 106 by using a translucent material, transparent materials may also be used to form diffusion panel 106 if an irregular surface is formed thereon. Methods of forming such an irregular surface upon the diffusion panel material include embossing or rolling the surface, as well as sand blasting the surface to form a mat finish. Diffusion panel 106 can vary in color and tint, if desired, to impart a particular color to the light transmitted by the shade mechanism.

As shown in FIG. 7A, diffusion panel 106 may extend in a position slightly spaced apart from, and out of contact with, rear face 104 of panel 100, whereby prismatic panel 100 and diffusion panel 106 define an insulating dead air space. Forming the slats of the shade mechanism in this manner can be used to form an insulating blanket at night by fully closing the slats to a near vertical position such that their edges overlap, thereby reducing heat loss or heat gain through the light opening during the night.

Still referring to FIG. 7A, diffusion panel 106 includes a first edge clip 108 extending from one side edge thereof, and a second edge clip 110 extending from the opposing side edge thereof. Edge clip 108 includes a finger 112 which extends over and around front face 102 of prismatic panel 100. Similarly, edge clip 110 includes a finger 114 which extends over and around the opposing side edge of front face 102. Edge clips 108 and 110 engage and rest against the opposing side walls of prismatic panel 100, while fingers 112 and 114 maintain diffusion panel 106 in the desired relationship with prismatic panel 102. FIGS. 7B, 7C and 7D illustrate alternate methods of securing diffusion panel 106 to prismatic panel 100. In FIG. 7B, side wall 116 extends upwardly from the edge of diffusion panel 106 and is secured by a weld 118 to a side wall of prismatic panel 100. In FIG. 7C, diffusion panel 106 includes upwardly extending side walls along the opposing longitudinal edges thereof, one of such sidewalls being shown by reference numeral 118. Thus, diffusion panel 106 is in the form of a channel or tray adapted to receive prismatic panel 102, which is retained therein under the force of gravity. In turn, interconnecting rung 33 of rope ladder 32 provides support for diffusion panel 106.

In FIG. 7D, an edge bracket, like that designated by reference numeral 120, is provided along each longitudinal edge of prismatic panel 100 and diffusion panel 106. The side edges of prismatic panel 100 and diffusion panel 106 are secured to edge bracket 120 by a suitable adhesive.

FIGS. 8A and 8B illustrate a manner in which a prismatic panel and its associated diffusion panel may be formed as a unitary hinged structure. Portion 122 is formed with a smooth front face and a prismatic rear face to form a prismatic reflective panel, while portion 124 is initially formed as a clear transparent panel. Portions 122 and 124 are joined by a narrowed region 126 which extends longitudinally through the structure to hingedly connect portion 122 to portion 124. Following extrusion or injection molding of the structure shown in FIG. 8A from a clear, light-transmissive material, one or both faces of portion 124 are processed, as by sandblasting, to form a light-diffusing mat finish. As shown in FIG. 8B, the structure is then folded about its hinged joint 126 to position prismatic panel portion 122 directly above diffusion portion 124. As shown in FIG. 8B, diffusion panel portion 124 is then positioned immediately below and adjacent to the prismatic surface of prismatic panel 122.

FIG. 9 illustrates in cross section a flat prismatic panel using three-faced linear prisms, like those described above in regard to FIG. 5, except that an extension member, shown in dashed outline and identified by reference numeral 128, extends from the third face 130 of at least one of the linear prisms. Extension member 128 includes a central portion 132 which extends generally away from front face 134 of the prismatic panel. A pair of arms 136 and 138 extend from the remote end of central portion 132 generally parallel to front face 134 for adding structural strength to the prismatic panel. Extension member 128 may also serve as a support member to which an associated diffusion panel may be attached. In FIG. 9, the diffusion panel 137 is shown as being secured to arms 136 and 138 of extension member 128.

Embodiments of the present invention which have been described above have each used prismatic reflective panels having a smooth front face adapted to be directed toward the sun. It has been determined that a portion of the otherwise useable indirect rays of sunlight are reflected off of the front face of the prismatic panel rather than being transmitted through the prismatic panel. To minimize the loss of such indirect rays of sunlight due to reflection off of the front face of the prismatic panels, the front face of such panels may be modified from a smooth surface to a stepped surface, as shown in FIG. 10. Prismatic panel 140 shown in FIG. 10 has a stepped front face designated generally by reference numeral 142 consisting of alternating first and second surfaces arranged perpendicular to one another. First surfaces 144 and 146 are each disposed at an angle of approximately 30° from the front face of slatted panel 140 as a whole, i.e., at an angle of approximately 30° to the lateral axis of panel 140. Second surfaces 148 and 150 extend perpendicular to first surfaces 144 and 146 and serve to interconnect alternating first surfaces. An incident ray of sunlight is shown in FIG. 10 by arrow 152, and, as noted in FIG. 10, ray 152 is not refracted as it enters first surface 146 because ray 152 is substantially perpendicular to surface 146. The rear face of prismatic panel 140 is designated generally by reference numeral 154 and includes a series of 3-faced linear prisms formed thereupon. However, because direct rays of sunlight are not refracted within panel 140, the linear prism formed by faces 156 and 158 is oriented such that a plane bisecting the angle formed therebetween extends parallel to ray 152. Similarly, the third face 160 of the linear prism defined by faces 156 and 158 is also positioned parallel to ray 152, i.e., perpendicular to first surface 146. As shown in FIG. 10, the number of steps formed upon front face 142 may advantageously be made equal to the number of 3-faced linear prisms formed upon rear face 154 of panel 140.

Within the embodiments of the present invention described above, the prismatic panels used to reflect direct rays of sunlight have incorporated linear prisms. However, those skilled in the art will appreciate that other types of prisms exhibiting internal reflection may also be formed upon the rear face of the prismatic panel in order to reflect direct rays of sunlight away from the space to be illuminated. With reference to FIG. 11A, multifaceted pyramidal prisms, such as prism 162, are formed upon the rear face of prismatic panel 163. As shown in FIG. 11A, pyramidal prism 162 includes three triangular faces which jointly terminate in an apex directed away from the rear face of panel 163. Each pyramidal prism has a base which lies in common with other pyramidal prisms formed upon the rear face of panel 163. FIGS. 11B, 11C, and 11D show examples of 4-sided, 5-sided, and 6-sided pyramidal triangular prisms, respectively, which may also be used for internally reflecting direct rays of sunlight entering the prismatic panel. Those skilled in the art will appreciate that the various faces of the triangular pyramidal prisms may be oriented other than at symmetrical angles in order to reflect direct rays of sunlight striking the front face of each prismatic panel at an oblique angle. FIG. 12A illustrates an example of a flat prismatic panel 166 used in combination with a flat diffusion panel 168. However, as indicated in FIG. 12B, prismatic panels may also be formed as stepped or segmented structures. Prismatic panel 170 shown in FIG. 12B includes a series of three segments 172, 174, and 176. Each such segment preferably includes a front face directed at an angle of approximately 30° from the lateral axis of panel 170. Accordingly, direct rays of sunlight to be internally reflected by panel 170 strike the front face of each such segment perpendicular thereto. The rear face of each such segment may consist of 2-faced linear prisms forming internal angles of 90° wherein each face extends at a 4520 angle relative to the front face of each segment. Diffusion panel 178 extends behind prismatic panel 170 substantially parallel to the lateral axis thereof for diffusing indirect sunlight transmitted thereby.

FIG. 12C generally illustrates an alternate embodiment of the prismatic panels and related diffusion panels wherein the prismatic panel 178 is bent into two halves 180 and 182 each having a smooth planar front face and a rear prismatic face. An associated diffusion panel 184 is also bent to provide a first half 186 lying parallel to prismatic portion 180, and a second half 188 lying parallel to prismatic portion 182.

Figure 13:
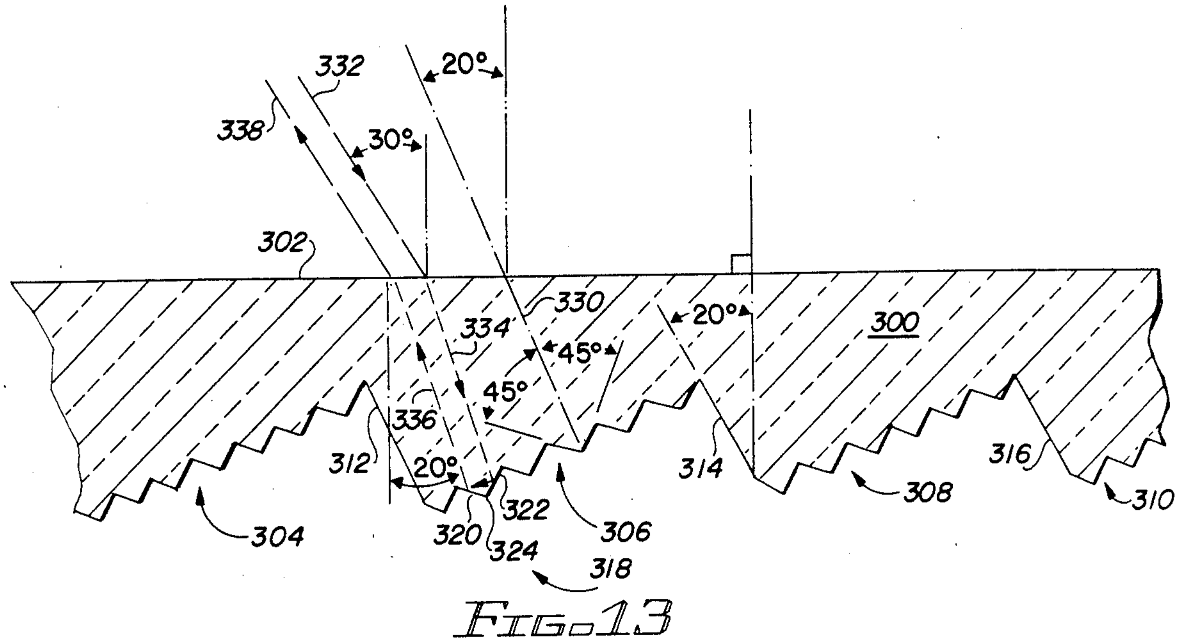
FIG. 13 is a cross-sectional view of a slatted prismatic panel having a smooth front face and a stepped rear face wherein each step includes a plurality of 2-faced linear elongated prisms.

Another form of slatted panel is shown in FIG. 13. The slatted panel shown in FIG. 13 is designated generally by reference numeral 300 and includes a smooth, relatively flat front face 302. The rear face of slatted panel 300 includes a series of first surfaces, designated by reference numerals 304, 306, 308 and 310 each extending parallel to the longitudinal axis of slatted panel 300 and each generally parallel to each other. The rear face of slatted panel 300 also includes a series of second surfaces 312, 314 and 316 each interposed between successive pairs of the aforementioned first surfaces. Thus, for example, second surface 312 is interposed between first surface 304 and second surface 306. Preferably, second surface 312 extends generally perpendicular to both first surface 304 and second surface 306.

Each first surface 304, 306, 308 and 310 of the rear face of slatted panel 300 has formed thereupon at least one prismatic surface for internally reflecting direct rays of sunlight, such as prism 318 on first surface 306. Preferably, each first surface 304, 306, 308 and 310 has formed thereupon a plurality of 2-faced linear prisms which extend parallel to the longitudinal axis of the slatted panel for substantially the full length thereof. Each such linear prism includes a first face 320 and a second face 322 of approximately equal width and having a common longitudinal edge 324. Preferably, the internal angle formed between faces 320 and 322 is 90°.

As shown in FIG. 13, a plane, designated by dashed line 330, bisecting one of the 2-faced linear prisms intersects front face 302 at an angle of approximately 20° to the normal. As also shown in FIG. 13, second surface 314 also extends at an angle of 20° to the normal relative to front face 302. Similarly, remaining second surfaces 312 and 316 extend parallel to second surface 314.

Within FIG. 13, incident direct ray of sunlight 332 is shown oriented along the central focal angle of 30° to the normal relative to front face 302. Incident ray 332 is refracted along the path designated 334, at an angle of approximately 20° to the normal, assuming an index of refraction of 1.5. Linear prism 318 internally reflects ray 334 and directs it back toward front face 302 along the path designated 336. As shown, reflected ray 336 extends at an angle of 20° to the normal. Reflected ray 336 exits from front face 302 as reflected ray 338 at an angle of 30° to the normal relative to front face 302. While incident ray 332 is shown being coincident with the central focal angle of 30°, it should be understood that each of the linear prisms also serves to internally reflect rays of light within a predetermined band of incident angles extending substantially symmerically about the central focal angle. Moreover, while the central focal angle shown in FIG. 13 is set at 30° to the normal, the central focal angle may vary within the range of 20°–40° to the normal, and still provide sufficient visibility between adjacent slatted panels of the shade mechanism; the central focal angle is preferably oriented within the range of 25°–35° to the normal.

Figure 14:
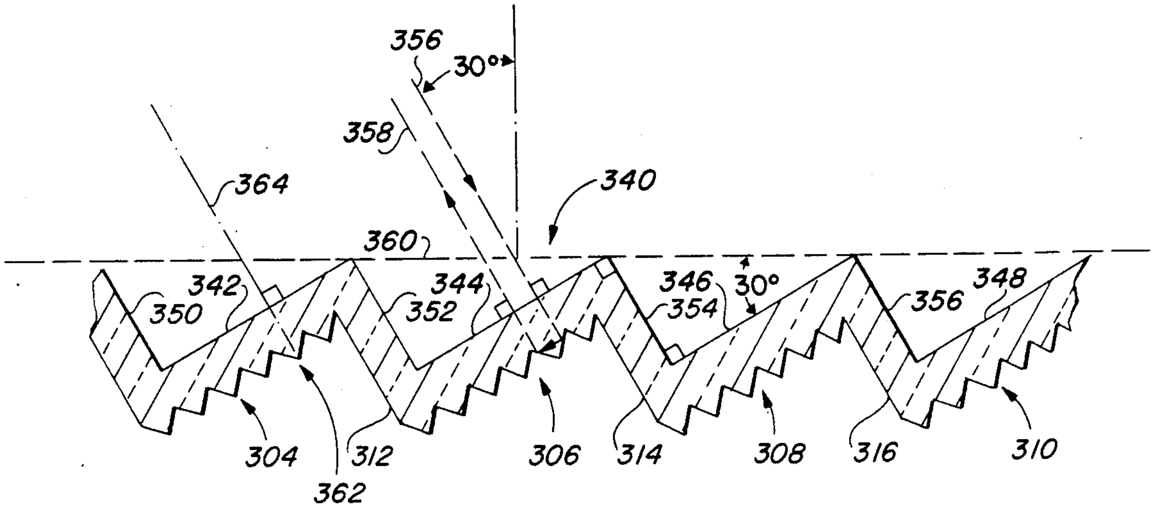
FIG. 14 is a cross-sectional view of a slatted prismatic panel similar to that shown in FIG. 13 but wherein the front thereof is provided with a stepped surface.

Referring now to FIG. 14, a slatted panel 340 is shown having a rear face substantially similar to that shown in FIG. 13. However, the front face of slatted panel 340 has a stepped surface including a series of first surfaces 342, 344, 346, and 348. The stepped front face also includes a series of second surfaces 350, 352, 354 and 356. Features of the rear face of slatted panel 340 common to those shown in FIG. 13 are designated by like reference numerals.

Within FIG. 14, second surface 352 is oriented at substantially 90° to first surfaces 342 and 344. Each of first surfaces 342, 344, 346 and 348 extends substantially parallel to the longitudinal axis of slatted panel 340 and parallel to one another. Similarly, second surfaces 350, 352, 354 and 356 extend substantially parallel to the longitudinal axis of slatted panel 340 and parallel to one another.

As shown in FIG. 14, first surfaces 342, 344, 346 and 348 are intended to be directed toward incident direct rays of sunlight for permitting such direct rays to strike such first surfaces substantially perpendicular thereto. Thus, within FIG. 14, incident light ray 356 and reflected light ray 358 are shown extending perpendicular to first surface 344. Each of first surfaces 342, 344, 346 and 348 is oriented to extend at an angle of substantially 30° to the front face of slatted panel 340 as a whole, as represented by dashed line 360. Similarly, first surfaces 304, 306, 308 and 310 of the rear face of slatted panel 340 are oriented at substantially 30° to the front face of slatted panel 340 as a whole. Second surfaces 312, 314 and 316 of the rear face of slatted panel 340 each extend substantially perpendicular to first surfaces 342, 344, 346 and 348 of the front face of slatted panel 340. First surface 304 of the rear face of slatted panel 340 includes a 2-faced linear prism 362 which may be bisected by a plane, (designated by dashed line 364) which extends substantially perpendicular to overlying first surface 342 of the front face thereof. As shown in FIG. 14, the number of steps formed upon the front face of slatted panel 340 may be equal in number to the number of steps formed upon the rear face of slatted panel 340.

While the various embodiments of the present invention described herein have been illustrated with horizontally-mounted prismatic slatted panels, those skilled in the art will also appreciate that prismatic panels constructed in accordance herewith may also be suspended vertically to form a vertical blind assembly adapted to reflect direct rays of sunlight while admitting indirect rays of sunlight and maximizing vision between adjacent slats. Such vertical blind assemblies would probably be most useful for light openings facing in an easterly or westerly direction. For light openings facing in a southernly direction, the slats would necessarily need to be rotated through a relatively large angle during the course of each day in order to continuously reflect away direct rays of sunlight.

While the present invention has been described above in its preferred form as utilizing a solar tracking mechanism including a sun position sensor and tilt drive motor, those skilled in the art will also appreciate thatthe prismatic panel tilt angle may also be manually controlled if desired.

While the present invention has been described herein for use in conjunction with vertically oriented light openings, for example windows, it should also be appreciated that the shade mechanism described herein may also be used in conjunction with horizontal or slanted light openings, for example, skylights.

Those skilled in the art will now appreciate that a shade mechanism has been described which permits the passage of indirect rays of sunlight into a space to be illuminated while reflecting away direct rays of sunlight, simultaneously minimizing interference with vision through the spaces between the slatted panels of the shade mechanism. It will also be appreciated that such a shade mechanism may be used in conjunction with diffusion panels to more evenly diffuse the light transmitted by such prismatic panels without restricting vision between these slatted panels. While the invention has been described with reference to several preferred embodiments thereof, the description is for illustrative purposes only and is not to be construed as limiting the scope of the invention. Various modifications and changes may be made by those skilled in the art without departing from the true spirit and scope of the invention.

I claim:

1. A shade mechanism for permitting the passage of indirect rays of sunlight into a space to be illuminated while reflecting direct rays of sunlight away from the space to be illuminated, said shade mechanism being adapted to minimize interference with vision through the shade mechanism for a person located within the illuminated space, said shade mechanism comprising in combination:

(a) a plurality of slatted panels extending parallel to one another and spaced apart from one another, each of said plurality of slatted panels extending about a longitudinal axis thereof;

(b) support means for supporting said plurality of slatted panels parallel to one another, said support means supporting each of said plurality of slatted panels for rotation about the longitudinal axis thereof;

(c) tilt means cooperating with said support means for causing each of said plurality of slatted panels to rotate in unison about its longitudinal axis while maintaining said plurality of slatted panels parallel to one another;

(d) each of said plurality of slatted panels being composed of a substantially clear, light transmissive material, each such panel having a front face for being directed at the sun and an opposing rear face, said rear face of each such panel having prisms formed thereon, said prisms causing rays of sunlight that strike the front face of each such panel in a predetermined band of angles relative to the normal to be internally reflected and emitted back out through the front face of each such panel, the predetermined band of angles extending substantially symmetrically about a central focal angle, said central focal angle extending within a range of about 20°–40° relative to the normal while said prisms permitting rays of sunlight that strike the front face of each such panel from an angle that lies outside said predetermined band of angles relative to the normal to be transmitted therethrough into the space to be illuminated.

2. A shade mechanism as recited by claim 1 wherein said central focal angle extends within a range of about 25°–35° to the normal relative to the front face of each such panel.

3. A shade mechanism as recited by claim 2 wherein said central focal angle extends at substantially 30° to the normal relative to the front face of each such panel.

4. A shade mechanism as recited by claim 1 wherein said tilt means is adapted to position said plurality of slatted panels in a manner such that a plane lying parallel to the longitudinal axis of one of said slatted panels and containing a direct ray of sunlight intercepts the front face of said slatted panel at an angle of approximately 30° to the normal to maximize reflection of direct rays of sunlight while minimizing interference with vision through the spaces between adjacent slatted panels.

5. A shade mechanism as recited by claim 4 wherein said tilt means includes solar tracking means for sensing the position of the sun and for rotating said plurality of panels in response to movements of the sun in order to maintain the front face of each such panel such that a line normal thereto forms an angle of approximately 30° with said plane that lies parallel to the longitudinal axis of said one slatted panel and that contains a direct ray of sunlight striking the front face of said one slatted panel.

6. A shade mechanism as recited by claim 1 including a plurality of diffusion panels, each diffusion panel being associated with a corresponding one of said slatted panels and being positioned adjacent the rear face of each such slatted panel substantially parallel thereto for diffusing light transmitted through each such slatted panel to more evenly illuminate the space to be illuminated.

7. A shade mechanism as recited by claim 6 wherein each of said plurality of diffusion panels is made of a translucent material.

8. A shade mechanism as recited by claim 6 wherein each of said plurality of diffusion panels is made of a transparent material upon which an irregular surface is formed to cause light passing therethrough to be diffused.

9. A shade mechanism as recited by claim 6 wherein each of said plurality of diffusion panels is supported substantially out of contact with its corresponding slatted panel to bound an insulating airspace therebetween to lessen the passage of heat through said shade mechanism when said plurality of slatted panels are rotated to a closed position.

10. A shade mechanism as recited by claim 6 wherein each of said plurality of diffusion panels has clips which extend from opposing side edges of each such diffusion panel, said clips being adapted to extend over and around opposing longitudinal edges of each slatted panel in order to maintain each diffusion panel in close proximity to the rear face of its corresponding slatted panel.

11. A shade mechanism as recited by claim 6 wherein each of said plurality of diffusion panels includes upwardly extending arms along the opposing longitudinal edges thereof, and wherein said upwardly extending arms are welded to the opposing longitudinal edges of a corresponding one of said plurality of slatted panels in order to maintain each diffusion panel in close proximity to the rear face of its corresponding slatted panel.

12. A shade mechanism as recited by claim 6 wherein each of said plurality of diffusion panels is in the form of a tray into which a corresponding one of said plurality of slatted panels is received, said support means supporting said plurality of diffusion panels which, in turn, support said plurality of slatted panels.

13. A shade mechanism as recited by claim 6 wherein each of said plurality of slatted panels and a corresponding one of said plurality of diffusion panels form a unitary hinged structure, one longitudinal edge of said slatted panel being hingedly connected to one longitudinal edge of said diffusion panel, said diffusion panel being folded under to underlie the rear face of said slatted panel.

14. A shade mechanism as recited by claim 6 wherein said tilt means includes solar tracking means for sensing the position of the sun and for rotating said plurality of slatted panels in response to movements of the sun.

15. A shade mechanism as recited by claim 14 wherein said tilt means maintains the front face of each slatted panel in a reflective position such that a plane that lies parallel to the longitudinal axis of one such slatted panel and containing a direct ray of sunlight that strikes such slatted panel forms an angle of approximately 30° with a line normal to the front face of such slatted panel to maximize reflection of direct rays of sunlight.

16. A shade mechanism as recited by claim 14 wherein said tilt means selectively maintains the front face of each slatted panel in an offset position such that a direct ray of sunlight that strikes one such slatted panel approaches from an angle relative to the normal lying outside said predetermined band of angles that are internally reflected by said prisms, to permit direct rays of sunlight to pass through such slatted panel and to be dispersed by the diffusion panel associated therewith.

17. A shade mechanism as recited by claim 1 wherein said prisms formed upon the rear face of each of said slatted panels are multifaceted pyramidal prisms.

18. A shade mechanism as recited by claim 1 wherein each of said slatted panels is substantially planar.

19. A shade mechanism as recited by claim 1 wherein each of said slatted panels is curved in lateral cross section.

20. A shade mechanism as recited by claim 1 wherein the front face of each of said plurality of slatted panels has a stepped surface, said stepped surface consisting of alternating first and second surfaces arranged at substantially 90° to one another, each of the first surfaces being disposed at an angle of approximately 30° from the front face of the slatted panel as a whole, the first surfaces being adapted to be perpendicular to direct rays of sunlight reflected by the prisms formed upon the rear face of each slatted panel.

21. A shade mechanism for permitting the passage of indirect rays of sunlight into a space to be illuminated while reflecting direct rays of sunlight away from the space to be illuminated, said shade mechanism being adapted to minimize interference with vision through the shade mechanism for a person located within the illuminated space, said shade mechanism comprising in combination:

(a) a plurality of slatted panels extending parallel to one another and spaced apart from one another, each of said plurality of slatted panels extending about a longitudinal axis thereof;

(b) support means for supporting said plurality of slatted panels parallel to one another, said support means supporting each of said plurality of slatted panels for rotation about the longitudinal axis thereof;

(c) tilt means cooperating with said support means for causing each of said plurality of slatted panels to rotate in unison about its longitudinal axis while maintaining said plurality of slatted panels parallel to one another; and (d) each of said plurality of slatted panels being composed of a substantially clear, light transmissive material, each such panel having a front face for being directed at the sun and an opposing rear face, said rear face of each such panel having a series of 3-faced linear prisms formed thereon and extending parallel to the longitudinal axis of each slatted panel, each 3-faced linear prism having a first face and a second face of approximately equal width and having a common longitudinal edge and forming an internal angle of substantially 90° therebetween, each 3-faced linear prism further including a third face extending between successive pairs of first and second faces, said third face lying substantially parallel to a plane which bisects the angle formed between said first and second faces, said first and second faces internally reflecting direct rays of sunlight striking the front face of each such panel in a predetermined band of angles and causing said internally reflected rays to be emitted back out through the front face of each such panel, the predetermined band of angles extending substantially symmetrically about a central focal angle, said central focal angle extending within a range of about 20°–40° to the normal relative to the front face of each such panel.

22. A shade mechanism as recited by claim 21 wherein said central focal angle extends within a range of about 25°–35° to the normal relative to the front face of each such panel.

23. A shade mechanism as recited by claim 22 wherein said central focal angle extends at substantially 30° to the normal relative to the front face of each such panel.

24. A shade mechanism as recited by claim 21 wherein both said third face and the plane bisecting the angle formed between said first and second faces extend at an angle of approximately 20° to the normal relative to the front face of each such panel.

25. A shade mechanism as recited by claim 21 wherein both said third face and the plane bisecting the angle formed between said first and second faces extend at an angle in the range of approximately 13°–26° to the normal relative to the front face of each such panel.

26. A shade mechanism as recited by claim 25 wherein both said third face and the plane bisecting the angle formed between said first and second faces extend at an angle in the range of approximately 16°–23° to the normal relative to the front face of each such panel.

27. A shade mechanism as recited in claim 21 wherein each of said slatted panels is mounted horizontally.

28. A shade mechanism as recited by claim 21 wherein said tilt means is adapted to position said plurality of slatted panels in a manner such that a plane lying parallel to the longitudinal axis of one of said slatted panels and containing a direct ray of sunlight intercepts the front face of said slatted panel at an angle of approximately 30° to the normal to maximize reflection of direct rays of sunlight while minimizing interference with vision through the spaces between adjacent slatted panels.

29. A shade mechanism as recited by claim 28 wherein said tilt means includes solar tracking means for sensing the position of the sun and for rotating said plurality of panels in response to movements of the sun in order to maintain the front face of each such panel such that a line normal thereto forms an angle of approximately 30° with said plane that lies parallel to the longitudinal axis of said one slatted panel and that contains a direct ray of sunlight striking the front face of said one slatted panel.

30. A shade mechanism as recited by claim 21 wherein each of said plurality of slatted panels is curved in lateral cross section, and wherein said series of three-faced linear prisms includes at least one central linear prism located substantially near the lateral center of each slatted panel, said central linear prism being oriented such that both its third face and a plane bisecting the angle formed between its first and second faces extend at angle of approximately 20° to a line lying normal to the center portion of the front face of each slatted panel, and wherein the remainder of said series of 3-faced linear prisms are oriented to internally reflect rays of sunlight incident from the same elvational angle as rays of sunlight internally reflected by said central linear prism.

31. A shade mechanism as recited by claim 21 wherein each of said slatted panels includes an extension extending from the third face of at least one of said 3-faced linear prisms, said extension being directed generally away from the front face of the slatted panel for adding structural strength to the slatted panel.

32. A shade mechanism as recited by claim 31 including a plurality of diffusion panels, each diffusion panel being associated with a corresponding one of said slatted panels and being positioned proximate to the rear face of each such slatted panel substantially parallel thereto for diffusing light transmitted through each such slatted panel to more evenly illuminate the space to be illuminated, each of said plurality of diffusion panels being attached to said extension extending from the third face of one of said 3-faced linear prisms formed upon the rear face of the slatted panel associated with each such diffusion panel.

33. A shade mechanism as recited by claim 21 including a plurality of diffusion panels, each diffusion panel being associated with a corresponding one of said slatted panels and being positioned adjacent the rear face of each such slatted panel substantially parallel thereto for diffusing light transmitted through each such slatted panel to more evenly illuminate the space to be illuminated.

34. A shade mechanism as recited by claim 21 wherein the front face of each of said plurality of slatted panels has a stepped surface, said stepped surface consisting of alternating first and second surfaces arranged at substantially 90° to one another, each of the first surfaces being disposed at an angle of approximately 30° from the front face of the slatted panel as a whole, the first surfaces being adapted to be perpendicular to rays of sunlight internally reflected by the 3-faced linear prisms formed upon the rear face of each slatted panel.

35. A shade mechanism as recited by claim 34 wherein the number of steps formed upon the front face of each slatted panel is substantially equal to the number of 3-faced linear prisms formed upon the rear face thereof.

36. A shade mechanism for permitting the passage of indirect rays of sunlight into a space to be illuminated while reflecting direct rays of sunlight away from the space to be illuminated, said shade mechanism being adapted to minimize interference with vision through the shade mechanism for a person located within the illuminated space, said shade mechanism comprising in combination:

(a) a plurality of slatted panels extending parallel to one another and spaced apart from one another, each of said plurality of slatted panels extending about a longitudinal axis thereof;

(b) support means for supporting said plurality of slatted panels parallel to one another, said support means supporting each of said plurality of slatted panels for rotation about the longitudinal axis thereof;

(c) tilt means cooperating with said support means for causing each of said plurality of slatted panels to rotate in unison about its longitudinal axis while maintaining said plurality of slatted panels parallel to one another;

(d) each of said plurality of slatted panels being composed of a substantially clear, light transmissive material, each such panel having a front face for being directed at the sun and an opposing rear face, said rear face of each such slatted panel having prisms formed thereon for causing direct rays of sunlight that strike the front face of each such panel within a predetermined range of angles to be internally reflected and emitted back out through the front face of each such panel, while permitting rays of sunlight outside of said predetermined range to be transmitted therethrough into the space to be illuminated; and (e) a plurality of diffusion panels, each diffusion panel being associated with a corresponding one of said slatted panels and being positioned adjacent the rear face of each such slatted panel substantially parallel thereto for diffusing light transmitted through each such slatted panel to more evenly illuminate the space to be illuminated.

37. A shade mechanism as recited by claim 36 wherein each of said plurality of diffusion panels is made of a translucent material.

38. A shade mechanism as recited by claim 36 wherein each of said plurality of diffusion panels is made of a transparent material upon which an irregular surface is formed to cause light passing therethrough to be diffused.

39. A shade mechanism as recited by claim 36 wherein each of said plurality of diffusion panels is supported substantially out of contact with its corresponding slatted panel to bound an insulating airspace therebetween to lessen the passage of heat through said shade mechanism when said plurality of slatted panels are rotated to a closed position.

40. A shade mechanism as recited by claim 36 wherein each of said plurality of diffusion panels has clips which extend from opposing side edges of each such diffusion panel, said clips being adapted to extend over and around opposing longitudinal edges of each slatted panel in order to maintain each diffusion panel in close proximity to the rear face of its corresponding slatted panel.

41. A shade mechanism as recited by claim 36 wherein each of said plurality of diffusion panels includes upwardly extending arms along the opposing longitudinal edges thereof, and wherein said upwardly extending arms are welded to the opposing longitudinal edges of a corresponding one of said plurality of slatted panels in order to maintain each diffusion panel in close proximity to the rear face of its corresponding slatted panel.

42. A shade mechanism as recited by claim 36 wherein each of said plurality of diffusion panels is in the form of a tray into which a corresponding one of said plurality of slatted panels is received, said support means supporting said plurality of diffusion panels which, in turn, support said plurality of slatted panels.

43. A shade mechanism as recited by claim 36 wherein each of said plurality of slatted panels and a corresponding one of said plurality of diffusion panels form a unitary hinged structure, one longitudinal edge of said slatted panel being hingedly connected to one longitudinal edge of said diffusion panel, said diffusion panel being folded under to underlie the rear face of said slatted panel.

44. A shade mechanism as recited by claim 36 wherein said plurality of diffusion panels are tinted to impart colorization to the light transmitted by said shade mechanism.

45. A shade mechanism as recited by claim 36 wherein said tilt means includes solar tracking means for sensing the position of the sun and for rotating said plurality of slatted panels in response to movements of the sun.

46. A shade mechanism as recited by claim 45 wherein said tilt means maintains the front face of each slatted panel in a reflective position such that a plane that lies parallel to the longitudinal axis of one such slatted panel and containing a direct ray of sunlight that strikes such slatted panel forms an angle of approximately 30° with a line normal to the front face of such slatted panel to maximize reflection of direct rays of sunlight.

47. A shade mechanism as recited by claim 45 wherein said tilt means selectively maintains the front face of each slatted panel in an offset position such that a plane that lies parallel to the longitudinal axis of one such slatted panel and containing a direct ray of sunlight that strikes such slatted panel forms an angle of less than 21° with a line normal to the front face of such slatted panel to permit direct rays of sunlight to pass through such slatted panel and to be dispersed by the diffusion panel associated therewith.

48. A shade mechanism for permitting the passage of indirect rays of sunlight into a space to be illuminated while reflecting direct rays of sunlight away from the space to be illuminated, said shade mechanism being adapted to minimize interference with vision through the shade mechanism for a person located within the illuminated space, said shade mechanism comprising in combination:

(a) a plurality of slatted panels extending parallel to one another and spaced apart from one another, each of said plurality of slatted panels extending about a longitudinal axis thereof;

(b) support means for supporting said plurality of slatted panels parallel to one another, said support means supporting each of said plurality of slatted panels for rotation about the longitudinal axis thereof;

(c) tilt means cooperating with said support means for causing each of said plurality of slatted panels to rotate in unison about its longitudinal axis while maintaining said plurality of slatted panels parallel to one another; and (d) each of said plurality of slatted panels being composed of a substantially clear, light transmissive material, each such panel having a front face for being directed at the sun and an opposing rear face, said rear face including a plurality of first surfaces each extending parallel to the longitudinal axis of such slatted panel, said rear face further including a plurality of second surfaces each interposed between successive pairs of first surfaces, each first surface having formed thereupon at least one 2-faced linear prism extending parallel to the longitudinal axis of such slatted panel, each 2-faced linear prism having a first face and a second face of approximately equal width and having a common longitudinal edge and forming an internal angle of substantially 90° therebetween, said plurality of second surfaces each lying substantially parallel to a plane which bisects the angle formed between said first and second faces, said first and second faces internally reflecting direct rays of sunlight striking the front face of each such slatted panel in a predetermined band of angles and causing said internally reflected rays to be emitted back out through the front face of each such slatted panel.

49. A shade mechanism as recited by claim 48 wherein the predetermined band of angles extends substantially symmetrically about a central focal angle, said central focal angle extending within a range of about 20°-40° to the normal relative to the front face of each such panel.

50. A shade mechanism as recited by claim 49 wherein said central focal angle extends within a range of about 25°-35° to the normal relative to the front face of each such panel.

51. A shade mechanism as recited by claim 50 wherein said central focal angle extends at substantially 30° to the normal relative to the front face of each such panel.

52. A shade mechanism as recited by claim 51 wherein the the plane bisecting the angle formed between the first and second faces of each 2-faced linear prism is substantially at 20° to the normal relative to the front face of each such slatted panel.

53. A shade mechanism as recited by claim 48 wherein the front face of each of said plurality of slatted panels has a stepped surface, said stepped surface consisting of alternating first and second surfaces arranged at substantially 90° to one another, each of the first surfaces of said front face being disposed at an angle of approximately 30° from the front face of the slatted panel as a whole, the first surfaces being adapted to be perpendicular to rays of sunlight internally reflected by the 2-faced linear prisms formed upon the rear face of each slatted panel, the plane bisecting the angle formed between the first and second faces of said 2-faced linear prisms lying substantially perpendicular to an overlying first surface of said front face.

54. A shade mechanism as recited by claim 53 wherein the number of first surfaces formed upon the front face of each slatted panel is substantially equal to the number of first surfaces formed upon the rear face thereof.

* * * * *